(12) United States Patent
Fetterman et al.

(10) Patent No.: US 8,136,145 B2
(45) Date of Patent: Mar. 13, 2012

(54) NETWORK AUTHENTICATION FOR ACCESSING SOCIAL NETWORKING SYSTEM INFORMATION BY A THIRD PARTY APPLICATION

(75) Inventors: Dave Fetterman, San Francisco, CA (US); Adam D'Angelo, Mountain View, CA (US)

(73) Assignee: Facebook, Inc., Palo Alto, CA (US)

( * ) Notice: Subject to any disclaimer, the term of this patent is extended or adjusted under 35 U.S.C. 154(b) by 962 days.

(21) Appl. No.: 12/077,070

(22) Filed: Mar. 13, 2008

(65) Prior Publication Data
US 2008/0313714 A1 Dec. 18, 2008

Related U.S. Application Data

(60) Provisional application No. 60/906,961, filed on Mar. 13, 2007.

(51) Int. Cl.
*G06F 21/00* (2006.01)
*G06F 15/16* (2006.01)
*G06F 17/40* (2006.01)

(52) U.S. Cl. ............... 726/3; 726/27; 713/182; 709/204

(58) Field of Classification Search ..................... None
See application file for complete search history.

(56) References Cited

U.S. PATENT DOCUMENTS

| | | | |
|---|---|---|---|
| 5,937,413 | A | 8/1999 | Hyun |
| 6,029,141 | A | 2/2000 | Bezos |
| 6,374,359 | B1 | 4/2002 | Shrader et al. |
| 7,013,292 | B1 | 3/2006 | Hsu |
| 7,249,123 | B2 | 7/2007 | Elder |
| 7,269,590 | B2 | 9/2007 | Hull |
| 7,677,970 | B2 * | 3/2010 | O'Kelley et al. ............... 463/25 |
| 2001/0037721 | A1 | 11/2001 | Hasegawa |
| 2002/0059201 | A1 | 5/2002 | Work |
| 2003/0145093 | A1 | 7/2003 | Oren |
| 2003/0222918 | A1 | 12/2003 | Coulthard |
| 2003/0225632 | A1 | 12/2003 | Tong |
| 2004/0024846 | A1 | 2/2004 | Randall |
| 2004/0088177 | A1 | 5/2004 | Travis |
| 2004/0148275 | A1 | 7/2004 | Achlioptas |
| 2005/0021750 | A1 * | 1/2005 | Abrams ........................ 709/225 |

(Continued)

OTHER PUBLICATIONS

PCT International Search Report and Written Opinion, PCT/US2008/003383, Jul. 14, 2008.

(Continued)

*Primary Examiner* — Nasser Goodarzi
*Assistant Examiner* — Fatoumata Traore
(74) *Attorney, Agent, or Firm* — Fenwick & West LLP (57) ABSTRACT

Exemplary systems and methods for network authentication are provided. Exemplary systems include an application program interface configured for receiving a request for an authentication code, a code generator in communication with the application program interface, the code generator configured to generate the authentication code, and the application program interface further configured to receive the generated authentication code and allow an application to communicate digital data with a web-based social network. Further systems include the generated authentication code being received from a network device without an Internet browser and the received generated authentication code allowing an application to communicate digital data with a web-based social network for an extended period of time. Exemplary methods include receiving a request for an authentication code, generating the authentication code, receiving the generated authentication code, and allowing an application to communicate digital data with a web-based social network.

20 Claims, 11 Drawing Sheets

U.S. PATENT DOCUMENTS

| | | | |
|---|---|---|---|
| 2005/0114759 A1 | 5/2005 | Williams | |
| 2005/0154639 A1 | 7/2005 | Zetmeir | |
| 2005/0159970 A1 | 7/2005 | Buyukkokten | |
| 2005/0171799 A1 | 8/2005 | Hull | |
| 2005/0171955 A1 | 8/2005 | Hull | |
| 2005/0177385 A1 | 8/2005 | Hull | |
| 2005/0197846 A1 | 9/2005 | Pezaris | |
| 2005/0198020 A1 | 9/2005 | Garland | |
| 2005/0198031 A1 | 9/2005 | Pezaris | |
| 2005/0198305 A1 | 9/2005 | Pezaris | |
| 2005/0203807 A1 | 9/2005 | Bezos | |
| 2005/0216300 A1* | 9/2005 | Appelman et al. | 705/1 |
| 2005/0216550 A1 | 9/2005 | Paseman | |
| 2005/0235062 A1 | 10/2005 | Lunt | |
| 2005/0256756 A1 | 11/2005 | Lam | |
| 2006/0041543 A1 | 2/2006 | Achlioptas | |
| 2006/0042483 A1 | 3/2006 | Work | |
| 2006/0048059 A1 | 3/2006 | Etkin | |
| 2006/0052091 A1 | 3/2006 | Onyon | |
| 2006/0080613 A1 | 4/2006 | Savant | |
| 2006/0085419 A1 | 4/2006 | Rosen | |
| 2006/0136419 A1 | 6/2006 | Brydon | |
| 2006/0143183 A1 | 6/2006 | Goldberg | |
| 2006/0161599 A1 | 7/2006 | Rosen | |
| 2006/0184617 A1 | 8/2006 | Nicholas | |
| 2006/0190281 A1 | 8/2006 | Kott | |
| 2006/0194186 A1 | 8/2006 | Nanda | |
| 2006/0218225 A1 | 9/2006 | Hee Voon | |
| 2006/0229063 A1 | 10/2006 | Koch | |
| 2006/0230061 A1 | 10/2006 | Sample | |
| 2006/0247940 A1 | 11/2006 | Zhu | |
| 2006/0248573 A1 | 11/2006 | Pannu | |
| 2006/0256008 A1 | 11/2006 | Rosenberg | |
| 2006/0265227 A1 | 11/2006 | Sadamura | |
| 2006/0293976 A1 | 12/2006 | Nam | |
| 2007/0043766 A1 | 2/2007 | Nicholas et al. | |
| 2007/0174389 A1 | 7/2007 | Armstrong | |
| 2007/0208916 A1 | 9/2007 | Tomita | |
| 2007/0282987 A1 | 12/2007 | Fischer | |
| 2008/0005076 A1 | 1/2008 | Payne | |
| 2008/0010343 A1 | 1/2008 | Escaffi | |
| 2008/0033776 A1 | 2/2008 | Marchese | |
| 2008/0040428 A1 | 2/2008 | Wei | |
| 2008/0070697 A1 | 3/2008 | Robinson | |
| 2008/0086458 A1 | 4/2008 | Robinson | |

OTHER PUBLICATIONS

Flores, Fernando et al. "Computer systems and the design of organizational interaction." In ACM Transactions on Information Systems (TOIS), vol. 6, Issue 2, Apr. 1988.

Chipin. Chipin: The easy way to collect money [online], Dec. 15, 2006 http://web.archiye.org/web/20061215090739/www.chipin.com/overyiew.

Parzek, E. Social Networking to Chipln to a Good Cause [online]. Business Design Studio, Jun. 29, 2006 http://www.businessdesignstudio.com/resources/blogger/2006/06social-networking-tochipin-to-good.html.

U.S. Appl. No. 11/639,655, Mark Zuckerberg, Systems and Methods for Social Mapping, filed Dec. 14, 2006.

U.S. Appl. No. 11/646,206, Aaron Sittig, Systems and Methods for Generating a Social Timeline, filed Dec. 26, 2006.

U.S. Appl. No. 11/493,291, Mark Zuckerberg, Systems and Methods for Dynamically Generating a Privacy Summary, filed Jul. 25, 2006.

U.S. Appl. No. 11/701,698, Jed Stremel, System and Method for Digital File Distribtuion, filed Feb. 2, 2007.

U.S. Appl. No. 11/713,455, Jed Stremel, Systems and Methods for Automatically Locating Web-Based Social Network Members, filed Feb. 28, 2007.

U.S. Appl. No. 11/701,566, Jed Stremel, System and Method for Automatic Population of a Contact File with Contact Content and Expression Content, Feb. 2, 2007.

U.S. Appl. No. 11/502,757, Andrew Bosworth, Systems and Methods for Generating Dynamic Relationship-Based Content Personalized for Members of a Web-Based Social Network, filed Aug. 11, 2006.

U.S. Appl. No. 11/503,093, Andrew Bosworth, Systems and Methods for Measuring User Affinity in a Social Network Environment, filed Aug. 11, 2006.

U.S. Appl. No. 11/503,037, Mark Zuckerberg, Systems and Methods for Providing Dynamically Selected Media Content to a User of an Electronic Device in a Social Network Environment, filed Aug. 11, 2006.

U.S. Appl. No. 11/503,242, Mark Zuckerberg, System and Method for Dynamically Providing a News Feed About a User of a Social Network, filed Aug. 11, 2006.

U.S. Appl. No. 11/499,093, Mark Zuckerberg, Systems and Methods for Dynamically Generating Segmented Community Flyers, filed Aug. 2, 2006.

U.S. Appl. No. 11/580,210, Mark Zuckerberg, System and Method for Tagging Digital Media, filed Oct. 11, 2006.

U.S. Appl. No. 11/893,493, Arieh Steinberg, Web-Based Social Network Badges, filed Aug. 15, 2007.

U.S. Appl. No. 11/982,974, Ruchi Sanghvi, Systems and Methods for a Web-Based Social Networking Environment Integrated Within One or More Computing and/or Networking Applications, filed Nov. 5, 2007.

U.S. Appl. No. 11/701,595, Ezra Callahan, System and Method for Determining a Trust Level in a Social Network Environment, filed Feb. 2, 2007.

U.S. Appl. No. 11/726,962, Charlie Cheever, System and Method for Confirming an Association in a Web-Based Social Network, filed Mar. 23, 2007.

U.S. Appl. No. 11/701,744, Andrew Bosworth, System and Method for Curtailing Objectionable Behavior in a Web-Based Social Network, filed Feb. 2, 2007.

U.S. Appl. No. 11/796,184, Jared S. Morgenstern, System and Method for Giving Gifts and Displaying Assets in a Social Network Environment, filed Apr. 27, 2007.

U.S. Appl. No. 11/893,797, Yun-Fang Juan, System and Method for Invitation Targeting in a Web-Based Social Network, filed Aug. 16, 2007.

U.S. Appl. No. 11/893,820, Yun-Fang Juan, Systems and Methods for Keyword Selection in a Web-Based Social Network, filed Aug. 16, 2007.

U.S. Appl. No. 11/899,426, Jared Morgenstern, System and Method for Collectively Giving Gifts in a Social Network Environment, filed Sep. 5, 2007.

U.S. Appl. No. 12/072 003, Arieh Steinberg, Systems and Methods for Implementation of a Structured Query Language Interface in a Distributed Database Environment, filed Feb. 21, 2008.

U.S. Appl. No. 12/154,504, Adam D'Angelo, Personalized Platform for Accessing Internet Applications, filed May 23, 2008.

U.S. Appl. No. 12/156,091, Mark Zuckerberg, Systems and Methods for Auction Based Polling, filed May 28, 2008.

U.S. Appl. No. 12/151,734, Jared Morgenstern, Systems and Methods for Classified Advertising in an Authenticated Web-Based Social Network, filed May 7, 2008.

U.S. Appl. No. 12/154,886, Nico Vera, Systems and Methods for Providing Privacy Settings for Applications Associated with a User Profile, filed May 27, 2008.

U.S. Appl. No. 11/893,559, Adam D'Angelo, Platform for Providing a Social Context to Software Applications, filed Aug. 15, 2007.

U.S. Appl. No. 12/080,808, Peter Deng, Systems and Methods for Calendaring, filed Apr. 2, 2008.

* cited by examiner

FIG. 1

| facebook developers | back to facebook login |

Developer Home
Documentation
Authentication
FQL
Photo Uploads
Update from Beta
Other Functionality
Errors
auth
  createToken
  getSession
fql
  query
events
  get
  getMembers
friends
  areFriends
  get
  getAppUsers
groups
  get
  getMembers
notifications
  get
photos
  addTag
  createAlbum
  get
  getAlbums
  getTags
  upload
update
  decodeIDs
users
  getInfo
  getLoggedinUser
Developer Account
Developer Group
Test Console Authentication
Login Procedure
The following is a detailed guide to the API login procedure. For a high-level overview, choose one of the following.
 • Web Apps
 • Desktop Apps
In order for a Facebook API client to use the API, the user of the client application must be logged in to Facebook. To accomplish this, direct your users to:
http://www.facebook.com/login.php?api_key = YOUR_API_KEY&v=1.0. which will prompt the user to log in if necessary. This URL supports these parameters.

api_key    Uniquely assigned to the vendor, and indentifiers, among other things, the list of acceptable source IPS for this call. Required.
v    The version of the API you are using. Should be set to "1.0". Required.
next    A way for web based applications to preserve some state for this login – this will get appended to their callback_url after the user logs in as described below. Optional.
auth_token    Before generating the login URL, the desktop application should call the facebook_auth_createToken API function, and then use the auth_token returned by that function here. Required for desktop apps.
popup    An alternative style for the login page that does not contain any Facebook navigational elements. For the best results, the pop-up should ideally have the following dimensions width = 626 pixels, height = 436 pixels. Optional.
skipcookie    Pass this in to allow a user to re-enter their login information. This may be useful if another Facebook user previously forgot to logout. Optional.
no-timeout    Pass this in to display a checkbox on the login page that a user can check to indicate that the subsequent session will never expire. Optional.

Upon successful authentication, if the user has never logged in to this application before, he will be asked to accept the terms of service for using the application. Finally, for web-based applications, the user is redirected to the site callback_url + next + separator + auth_token = ________, with these values as follows:

callback_url    The URL specified by the application developer on the account management page.
next    An optional string that can be passed in as next = parameter to login.php as described above
separator    Either ? or & depending on if the url already has a ? in it.
auth_token    A string that the application should immediately exchange for a session key via the facebook.auth.getSession method.

For desktop applications, the user will be directed to close their browser window and return to the application, at which point the application should call facebook.auth.getSession over https passing in the same auth_token that was used as a parameter to login.php. For desktop applications this method will return a "secret" which should be used in place of the desktop application's normal secret to sign all subsequent calls in this session.

Welcome, Julie

330 text

The user is then taken to the callback URL (provided on the developer account page), with the auth_token appended to the URL, like this:
http://www.yourapp.com/home.php?auth_token=abc123

The user is now successfully logged into the application.

Once the callback URL, store the auth_token from the URL - you'll later use it to establish a session.

$auth_token = $_GET('auth_token');

For more detailed information about the login procedure, check out the authentication guide.

FIG. 3B

Login Procedure for Desktop Apps

Create an auth_token by calling facebook:.auth.createToken.

Include_once 'facebookapi_php5restlib.php';

$server_url = 'http://api.facebook.com/restserver.php';

// Fill in your API key and secret.

$api_key – 'YOUR_API_KEY';

$secret = "YOUR_SECRET';

$client – new FacebookRestClient ($server_url_, $api_key, $secret,
                                                                    null, true);

$result = $client->auth_createToken( );

$auth_token = $result('token');

FooApp Desktop Utility

410 — FooApp is an exciting desktop application that helps manage your life using your data from Facebook.

Log in to Facebook now to get started!
(A browser window will open with the login page)

Your desktop application may look something like this (see bottom of page for a sample login button). Using the auth_token returned from facebook.auth.createToken, redirect the user to the following URL in a web browser, to login to Facebook.
http://www.facebook.com/lo
gin.php?
api_key=YOUR_A
PI_KEY&v1.0
&auth_token=abc123

420 — FooApp

Login to facebook to enjoy the full functionality of FooApp. If you don't want this to happen, go to the normal facebook login page Email ______________________
Password ______________________

If not already logged into Facebook, the user will be directed to a page like this

Client libraries
Product Directory
Open Source
FAQ

Infinite Sessions

510

By default, session keys returned by facebook.auth.getSession last 24 hours. Alternatively, to request a session key that never expires, your application can do either of the follow:

- Specify the no_timeout parameter to login.php. as described in the above login procedure. This will display a checkbox to the user. By checking this box, the user is granting permission to generate an infinite session for your application
- Direct the user to http://www.facebook.com/code_gen.php?v – 1.0&api_key=YOUR_API_KEY. On that page, the user will be able to generate a numerical auth token. The user will have to provide this auth token to your application, so the application should be able to accept the auth token as input from the user.

In both cases, the subsequent call to facebook.auth.getSession will return a session key that will not expire. Note that there is no way to programmatically generate an infinite session without interaction from the user. At any time, the user can revoke an infinite session on this own behalf on the privacy page.

Request Authentication

Once a session has been established, the session_key can be used to make request calls to the Facebook API. To make a request, the client should POST data to http://api.facebook.com/restserver.php. There are two types of requests – those that happen within the context of a session and those that do not require a session to exist. There are only two methods that happen outside the context of a session facebook.auth.createToken and facebook.auth.getSession (used to establish the session).

These are the parameters required for all API calls method    The method name. The method must be one of those exposed by the API documentation or the API will return error code 3 (with message 'Unknown method')

api key    The vendor-specific API key corresponding to the site making the API call. This is the same as in the login request.

Sig    The signature for the method call.

The signature is constructed using the following algorithm (after all the other arguments have been determined).

520

```
args – array of args o the request, formatted in arg-val pairs
sorted_array – alphabetically_sort_array_by_keys (arga);
request_atr – conatenate_in_order (sorted_array);
signature – md5 (concatenate (request_atr, secret))
```

For desktop applications, be sure to use the secret returned by getSession when signing a call that include a session_key. These are the parameters required for all API calls except those that happen outside of the context of a session.

session_key    The session key assigned to the user after they have logged in via the vendor page. This is the code returned to the application from the login request. This key may time out, after which the SAPI_EC_TIMEOUT error will be returned. The application will then need to redirect the user to the login page to obtain another key.

call_id    This is just a number that must increase with each API call in a particular session. We strongly recommend using the current time in milli- or micro-seconds. In PHP, this can be set equal to microtime(true).

Whether the request generates an error or not, an XML stream will be sent back to the application as a response to the request.

Logout Procedure

530

To enable a user to logout of Facebook, POST to http://www.facebook.com/logout.php, with the parameter 'confirm' set to 1.

A Mark Zuckerberg production
Facebook @ 2007

FIG. 5

| Facebook | login register help |
|---|---|
| Login | |

Eric's Test App

Login to Facebook to enjoy the full functionality of Eric's Test App. If you don't want this to happen, go to the normal Facebook login page.

Email: fetterman@post.harvard.edu

Password:

Optional: ☐ Check this box if you wish to remain permanently logged into the application.

[Login] [Register]

If you have forgotten your password, click here to reset it.

Security Note: After login, you should never provide your password to an outside application. Facebook does not provide your contact information to Eric's Test App.

NETWORK AUTHENTICATION FOR ACCESSING SOCIAL NETWORKING SYSTEM INFORMATION BY A THIRD PARTY APPLICATION

CROSS-REFERENCE TO RELATED APPLICATIONS

The present application claims the benefit and priority of U.S. Provisional Patent Application Ser. No. 60/906,961 filed on Mar. 13, 2007, titled "Systems and Methods for Network Authentication," which is incorporated herein by reference.

BACKGROUND OF THE INVENTION

1. Field of the Invention

The present invention relates generally to applications created by external, untrusted developers and more particularly to systems and methods for network authentication.

2. Description of Related Art

Conventionally, network devices that lack an Internet browser such as game consoles, certain mobile devices, home, car, boat, airplane computing systems, and/or other computing or digital data processing devices are unable to access and authenticate a connection to an Internet website, such as a web-based social network. Additionally, these same devices are unable to communicate with an application that may be operating between the device and an Internet website. Thus, there is a need for systems and methods for network authentication.

BRIEF DESCRIPTION OF THE DRAWINGS

FIG. 2 is a screenshot of an exemplary login procedure for network devices;

FIG. 5 shows a screenshot of an exemplary procedure for an infinite session, an exemplary authentication request procedure, and an exemplary logout procedure;

SUMMARY OF THE INVENTION

Exemplary methods for network authentication are provided. Such methods include receiving a request for an authentication code, generating the authentication code, receiving the generated authentication code, and allowing an application to communicate digital data with a web-based social network.

Exemplary systems for network authentication are also provided. Such systems include an application program interface configured for receiving a request for an authentication code, a code generator in communication with the application program interface, the code generator configured to generate the authentication code, and the application program interface further configured to receive the generated authentication code and allow an application to communicate digital data with a web-based social network. Further systems include the generated authentication code being received from a network device without an Internet browser, and the received generated authentication code allowing an application to communicate digital data with a web-based social network for an extended period of time.

DETAILED DESCRIPTION OF THE INVENTION

Provided herein are various exemplary systems and methods for network authentication that allow network devices without an Internet browser to access and authenticate a connection to a third-party application and/or an Internet website, such as a web-based social network.

Figure 1:
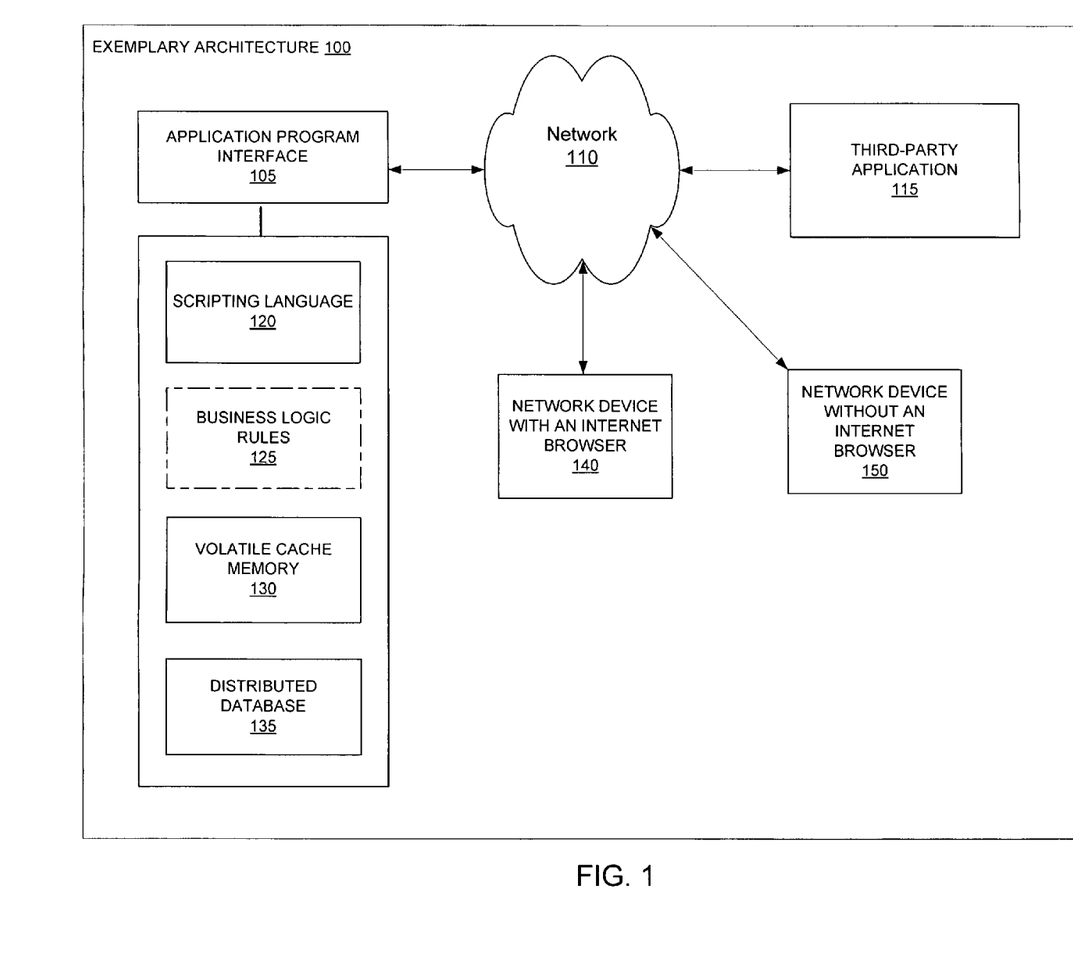
FIG. 1 illustrates an exemplary architecture for network authentication.

FIG. 1 illustrates an exemplary architecture for network authentication according to one system and method. The exemplary architecture 100 may include an application program interface (or "API") 105, a network 110, a third-party application 115, a scripting language 120, optional business logic rules 125, a volatile cache memory 130, a distributed database 135, a network device with an Internet browser 140, and a network device without an Internet browser 150. In various exemplary systems and methods, the application program interface 105, scripting language 120, business logic rules 125, volatile cache memory 130 and/or distributed database 135 may form part of a web-based social network. The network 110 may represent any network where the transmission of digital content occurs, including the Internet.

According to various exemplary systems and methods, the third-party application 115 may be a program that utilizes information found in a distributed database such as distributed database 135. The third-party application 115 may be an application created by and/or offered by a party or entity that is unknown and therefore not trusted nor checked for problems by an administrator of the distributed database environment and/or an administrator of a web-based social network. For instance, a distributed database for a social network may include profiles, photos, friends and/or relevant events for each user or member of the social network. The third-party application 115 may be a program such as a program for the generation of an electronic and/or hardcopy birthday card. Accordingly, the third-party application 115 may incorporate profile information and/or photo(s) for a particular social network member to generate a birthday card. The third-party application 115 may reside on a server internal or external to a web-based social network. The third-party application 115 may also be a desktop software application, a widget, a software application for a mobile device such as a phone or a Personal Digital Assistant ("PDA"), and/or an application for another computing device or digital data processor that is at least partly capable of establishing a network connection. Further, the computing device or digital data processor may or may not have an Internet browser, such as Microsoft Internet Explorer™ for network connectivity. For example, the third-party application 115 may be a software tool that resides on or works with a game console, digital camera, cell phone or networkable picture frame (all of which may lack an Internet browser) with a connection to a network that may communicate data with a web-based social network.

In one exemplary system and method, the distributed database 135 may be comprised of multiple databases and the number of databases may increase or decrease over time. The volatile cache memory 130 may pool some or all of the data found in the distributed database 135. In general, the volatile cache memory 130 facilitates rapid query response times, when compared to the time required for querying all or most all of the databases forming the distributed database 135. Further, the data found in the volatile cache memory 130 may represent some or all of the data that is communicated with the third-party application 115. The data found in the distributed database 135 may represent some or all of the data communicated with the third-party application 115 if the volatile cache memory 130 appears to lack certain pieces of data.

In one further exemplary system and method, the optional business logic rules 125 may represent limitations such as privacy settings that may be applied to data communicated with the third-party application 115. Such limitations may be selected by an owner of the data and/or by a network administrator. For example, a member of a social network may limit the other members of the social network that may access the member's personal information, such as the member's address and telephone number. Accordingly, the member may not want such personal information communicated with the third-party application 115 unless the member may continue to impose certain limitations upon the personal information and the way it is used by the third-party application 115.

The scripting language 120, according to various exemplary systems and methods, may be any programming environment typically used to create dynamic web pages, including, however not limited to, PHP Hypertext Preprocessor. With syntax from C, Java and Perl, PHP code may be embedded within HTML pages for server-side execution. PHP may be used to extract data from a database in order to present it on a web page. PHP may extract data out of the volatile cache memory 130. Optionally, PHP may apply the business logic rules 125 against extracted data. It is this data (with or without application of the business logic rules 125) that is generally provided to the third-party application 115 via the application program interface 105.

In one exemplary system and method, the application program interface 105 is a web service that may provide the third-party application 115 access to some or all of the information found in the distributed database 135 and/or the volatile cache memory 130. For example, the third-party application 115, such as the third-party application for the generation of a birthday card, may access a distributed database and/or a volatile cache memory associated with a social network through an application program interface for the social network.

The network device with an Internet browser 140, according to one exemplary system and method, may be most any computing or digital data processing device with an Internet browser (e.g. Netscape Navigator™ or Microsoft Internet Explorer™) that is capable of establishing a connection with the Internet. Examples may include desktop computers, laptop computers, and/or certain mobile devices such as cell phones or personal digital assistants ("PDAs").

The network device without an Internet browser 150, according to various exemplary systems and methods, may be most any computing or digital data processing device without an Internet browser. The device or processor is at least partly capable of establishing a connection with a network. Examples may include certain mobile devices, personal digital assistants ("PDAs"), game consoles, digital cameras, computers or processors in cars, boats or airplanes (e.g. navigation devices), stereo receivers, radios, and/or networkable picture frames, etc. In further systems and methods, the network device without an Internet browser 150 may include a computing or digital data processing device with an Internet browser, however, the Internet browser may not be used or relied upon for purposes of authenticating a connection to a distributed database environment.

FIG. 2 is a screenshot of an exemplary login procedure for network devices. Screenshot 200 shows an exemplary procedure that may be employed by a user of a device such as the network device with an Internet browser 140 (FIG. 1). According to one exemplary system and method, a user of a network device who desires to utilize a third-party application such as the third-party application 115 (FIG. 1) for accessing data from a web-based social network may do so via an application program interface such as the application program interface 105 (FIG. 1). The user may use the third-party application to access the data after the user has logged into the web-based social network.

According to one exemplary system and method, the login procedure shown in screenshot 200 describes the process for which a user of either a web-based third-party application or a desktop third-party application may login to a web-based social network, such as Facebook™. As shown in screenshot 200, should the user be logging into a third-party application for the first time, the user may be required to accept the terms of service for the use of the third-party application on the social network. For desktop third-party applications, after the user logs into and accepts the terms of service, the user may be directed to close their Internet browser window and to return to the desktop third-party application. Further, the user's ability to have the third-party application access the social network may expire after a fixed period of time. Alternatively, the user may have an option for the third-party application to access the social network for an extended period of time. In one further exemplary system and method, the exemplary login procedure shown in screenshot 200 describes a "no_timeout" parameter that facilitates a non-expiring session upon login.

Figure 3A:
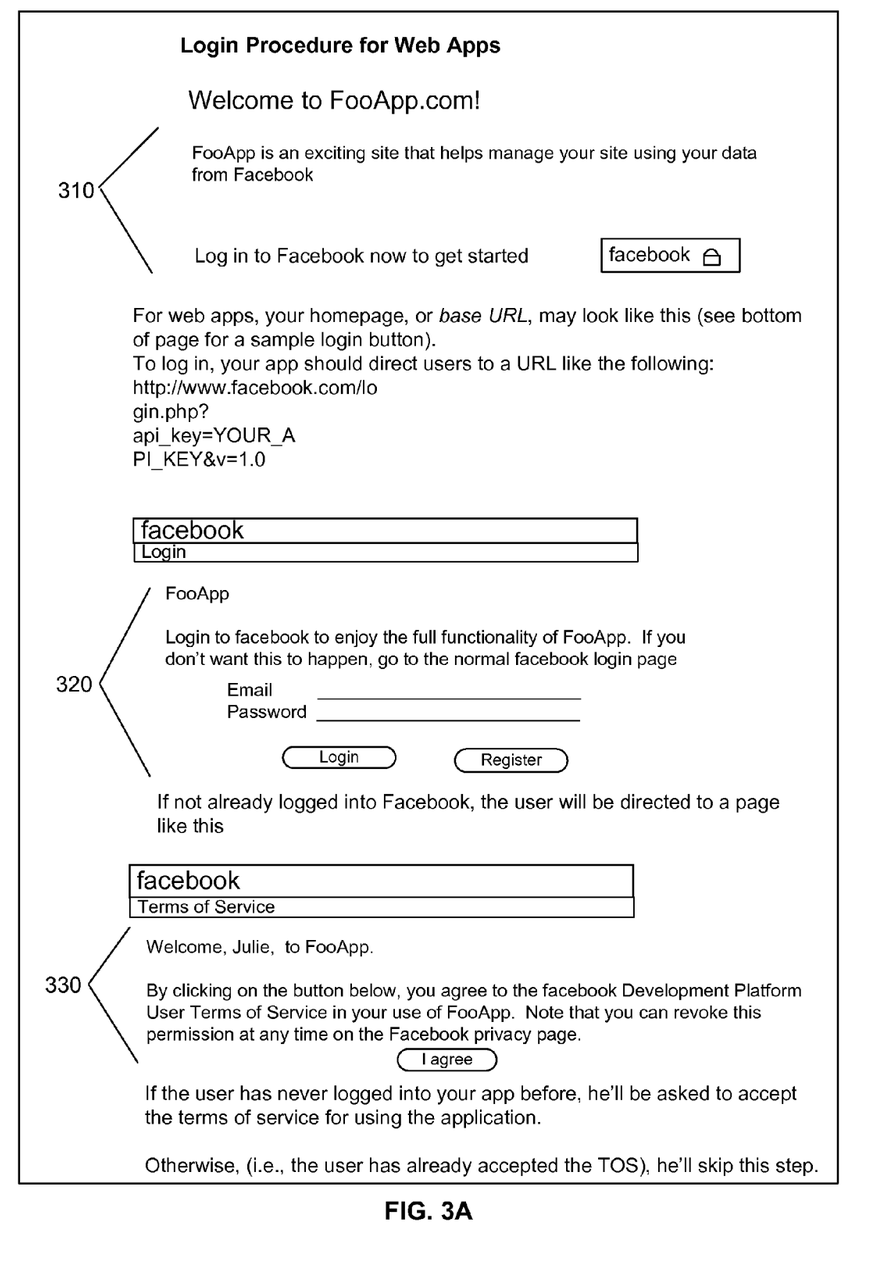
FIGS. 3A and 3B show screenshots of an exemplary login procedure for a web-based third-party application.
Figure 3B:
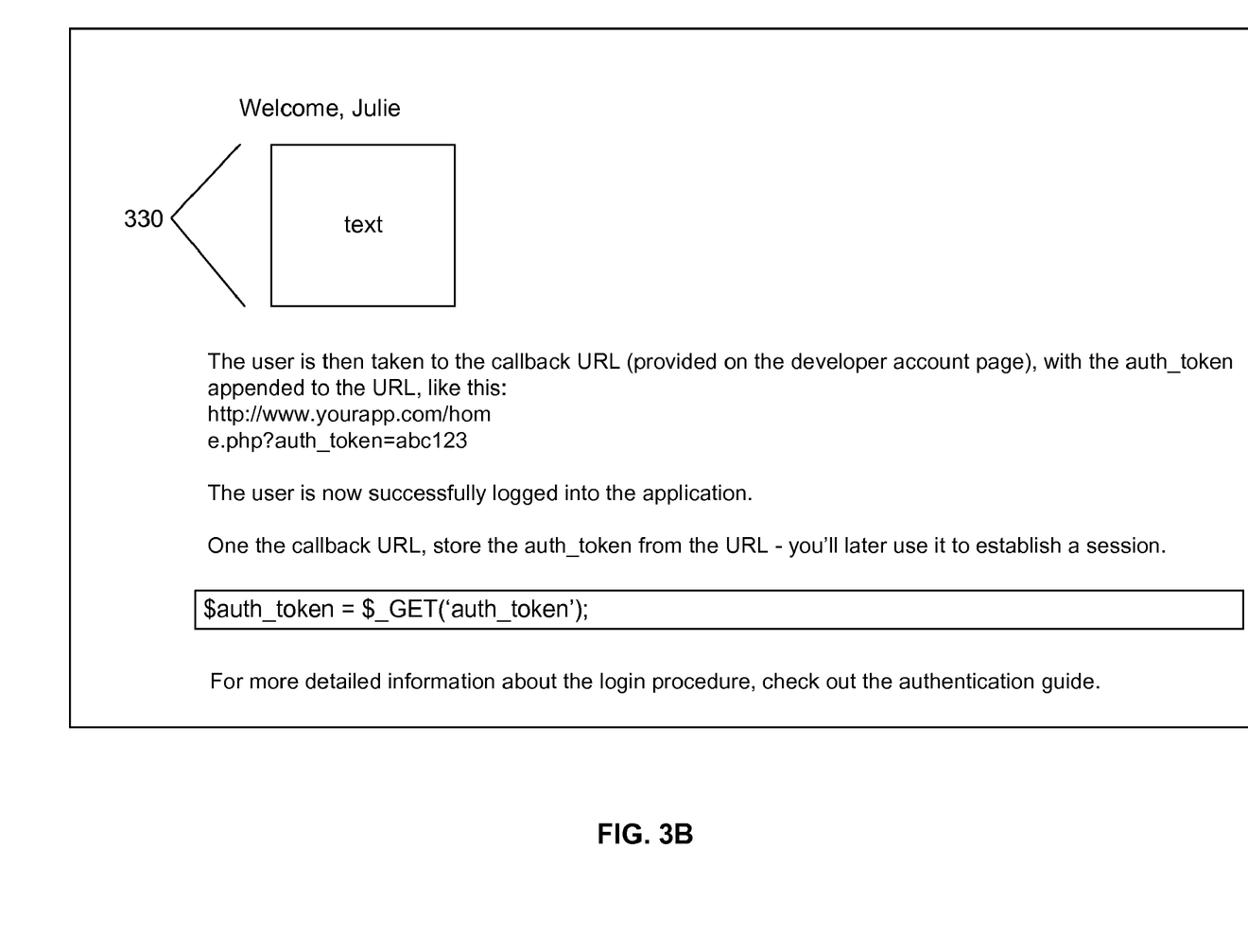

FIGS. 3A and 3B show screenshots of an exemplary login procedure for a web-based third-party application. Here, the web-based third-party application is titled "Foo.App." According to one exemplary system and method, the login procedure for a web-based third-party application may be utilized by a user of a web-based third-party application in order to access data in a web-based social network, such as Facebook™. As shown in screen 310, the web-based third-party application directs the user to begin the login process at screen 320. After logging into the third-party application and the social network from screen 320, if the user is not already logged into the social network, the user may be directed to screen 330, where the user is requested to agree to terms of service for the user's use of the third-party application on the social network. If the user has previously logged into a particular third-party application and has agreed to the terms of service for the use of the particular third-party application on the social network, the user may skip screen 330 and be directed to a screen such as screen 340. Screen 340 shows a welcome screen, which indicates the user's successful login to the web-based social network and the third-party application.

Figure 4A:
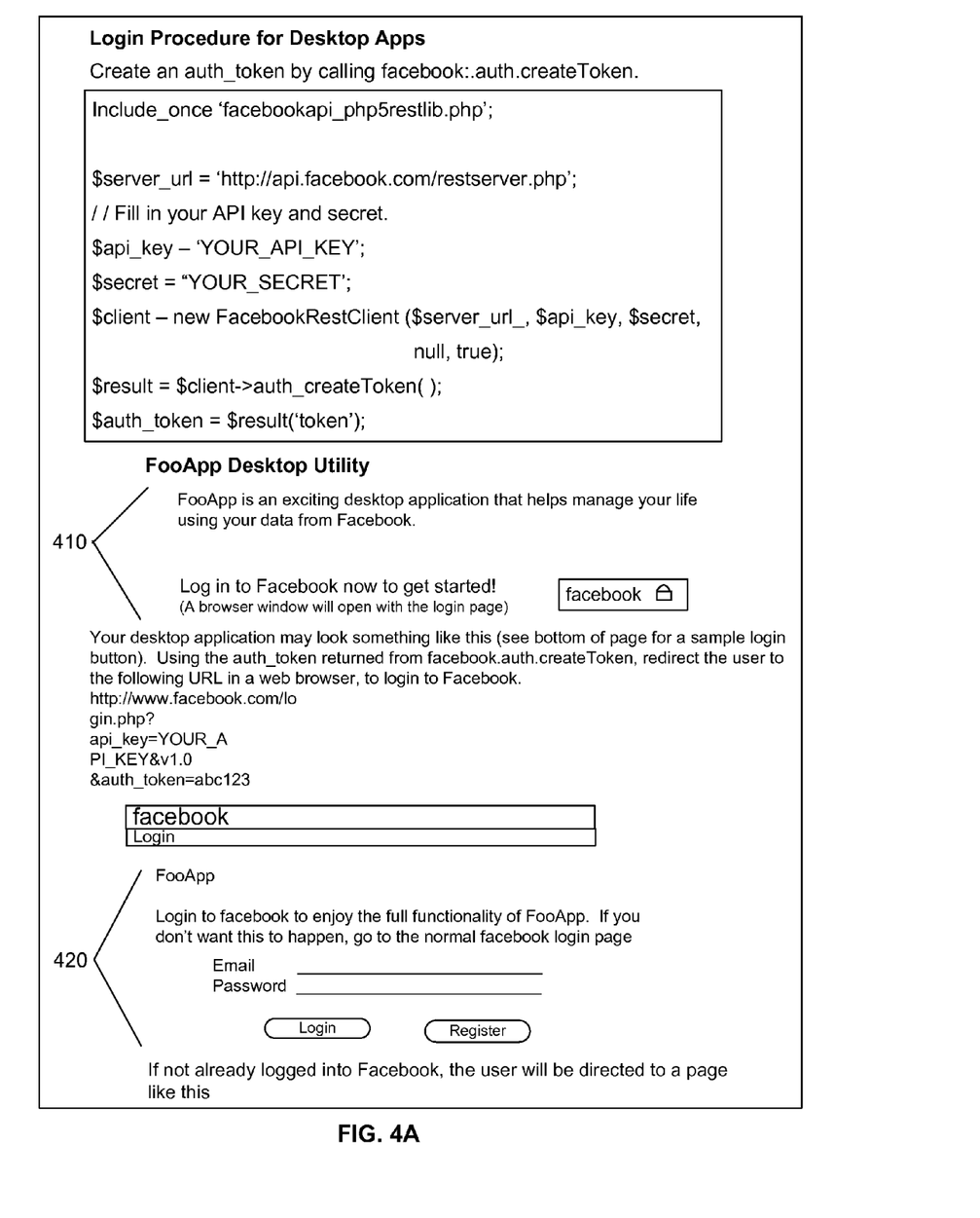
FIGS. 4A and 4B show screenshots of an exemplary login procedure for a desktop third-party application.
Figure 4B:
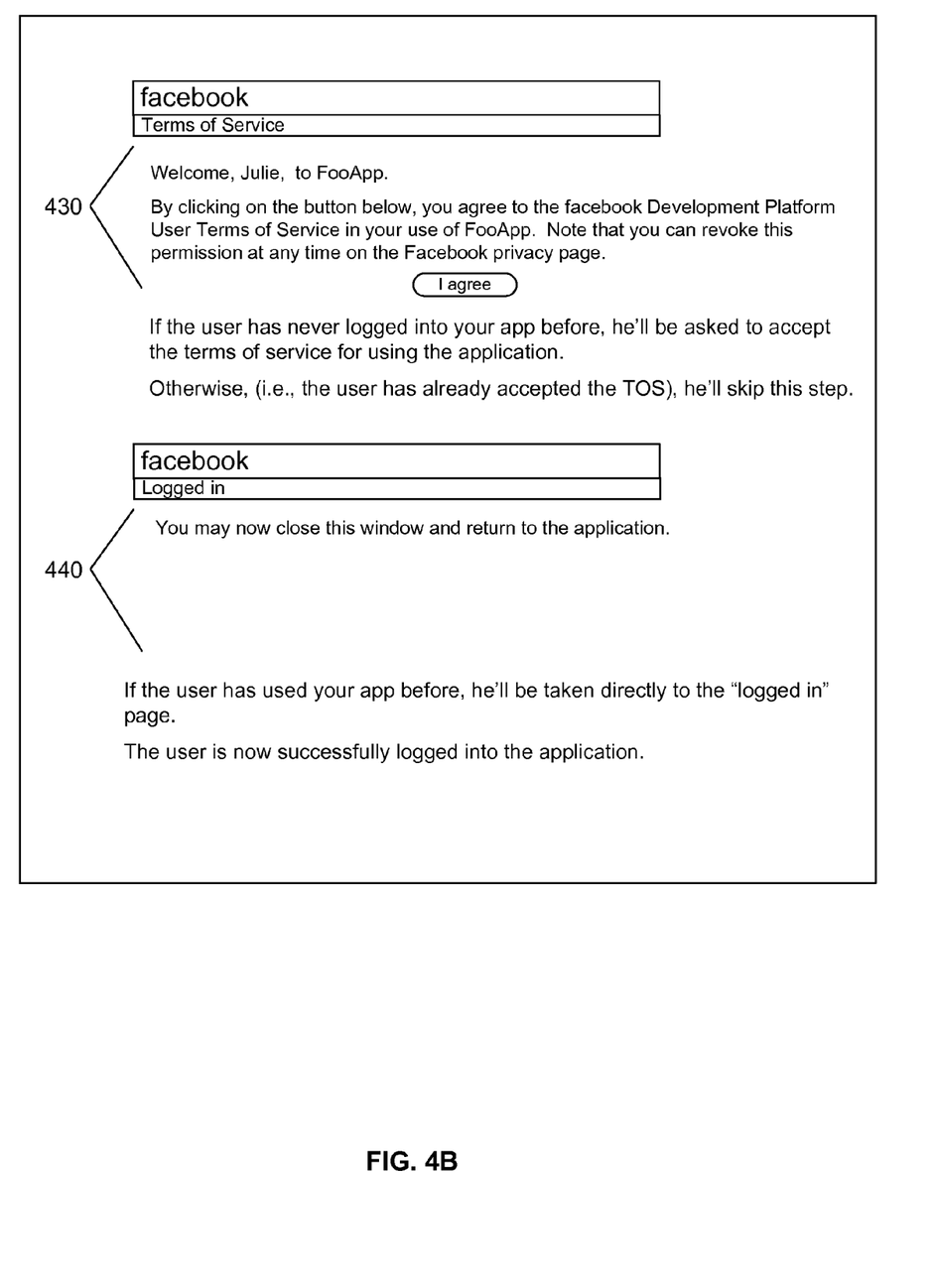

FIGS. 4A and 4B show screenshots of an exemplary login procedure for a desktop third-party application. Here, the desktop third-party application is titled "Foo.App." According to one exemplary system and method, the login procedure may be utilized by a user of a desktop third-party application to access data from a distributed database and/or a volatile cache memory associated with a web-based social network. As shown above screen 410, the desktop third-party application may use an authentication token ("auth_token") returned by a social network to redirect the user to screen 420 to begin the login process for the desktop third-party application. The user is prompted to login to the social network at screen 420. As shown in screen 430, after logging into the desktop third-party application and the social network, if the user has not previously logged into a particular desktop third-party application, the user is requested to agree to terms of service for the user's use of the third-party application on the web-based social network. If the user has previously logged into the particular desktop third-party application and has agreed to the terms of service for use of the particular third-party application on the social network, the user may skip screen 430 and be directed to screen 440, which instructs the user to close the window and return to the desktop third-party application.

FIG. 5 shows a screenshot of an exemplary procedure for an infinite session, an exemplary authentication request procedure, and an exemplary logout procedure. In one exemplary system and method, after a user logs into a third-party application and a web-based social network, the social network may allow the user to remain logged into the third-party application and the social network for a certain period of time by providing a session key. By default, session keys returned by a social network may last 24 hours. Item 510 in FIG. 5 shows an exemplary procedure for an extended or infinite session. In order to request a session key that does not expire, a third-party application may specify a no timeout parameter in connection with the login procedure. A checkbox may be displayed to the user, wherein if the user checks or highlights the box, the user grants permission for the third-party application to remain connected to the social network for an extended or infinite period of time. Alternatively, in order to request a session key that does not expire, the user may be directed by the third-party application to a specific uniform or universal resource locator ("URL") where the user may be able to generate a numerical authentication token (or "auth token"). The user may be required to provide the auth token to the third-party application. In both cases, subsequent calls to the web-based social network may return a session key that will not expire. According to a further system and method, the user may be allowed to revoke an extended or infinite session.

Item 520 in FIG. 5 shows an exemplary authentication request procedure. According to one exemplary system and method, once a session has been established, a session key may be used to make request calls to the application program interface for a web-based social network. Item 530 in FIG. 5 shows an exemplary logout procedure that a third-party application may use for enabling a user to logout of a web-based social network.

Figure 6:
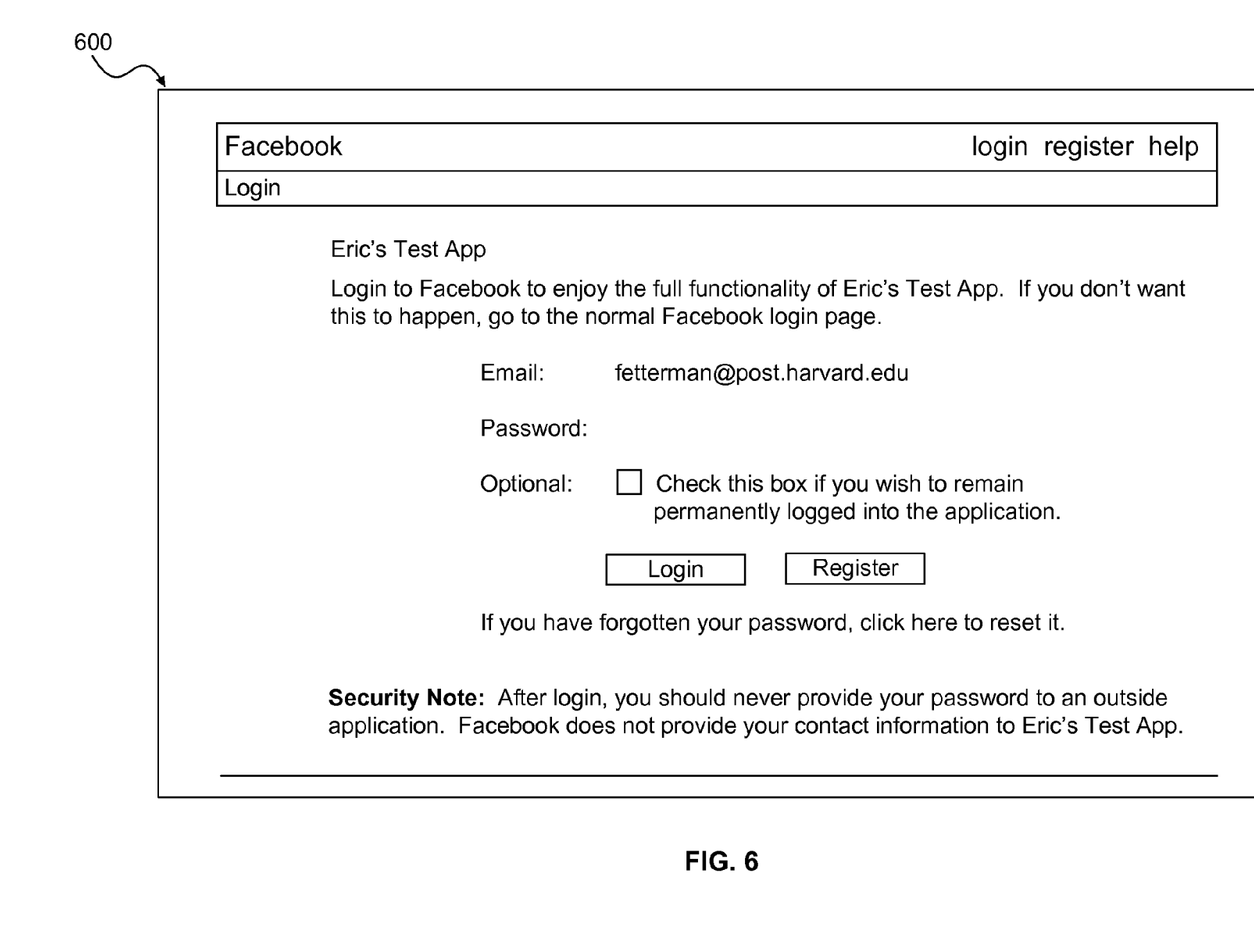
FIG. 6 shows a screenshot of an exemplary login screen for authenticating an extended session for a third-party application on a web-based social network.

FIG. 6 shows a screenshot of an exemplary login screen for authenticating an extended session for a third-party application on a web-based social network. Here, the third-party application is titled "Eric's Test App." As shown in screenshot 600, a user may employ the exemplary login screen to enjoy the full functionality of a third-party application by allowing it to communicate data with a web-based social network. For example, the third-party application may be able to incorporate information about the user's friends on the social network in creating content. Also shown in screenshot 600 is the ability for a user to request to remain permanently logged into the third-party application.

Figure 7:
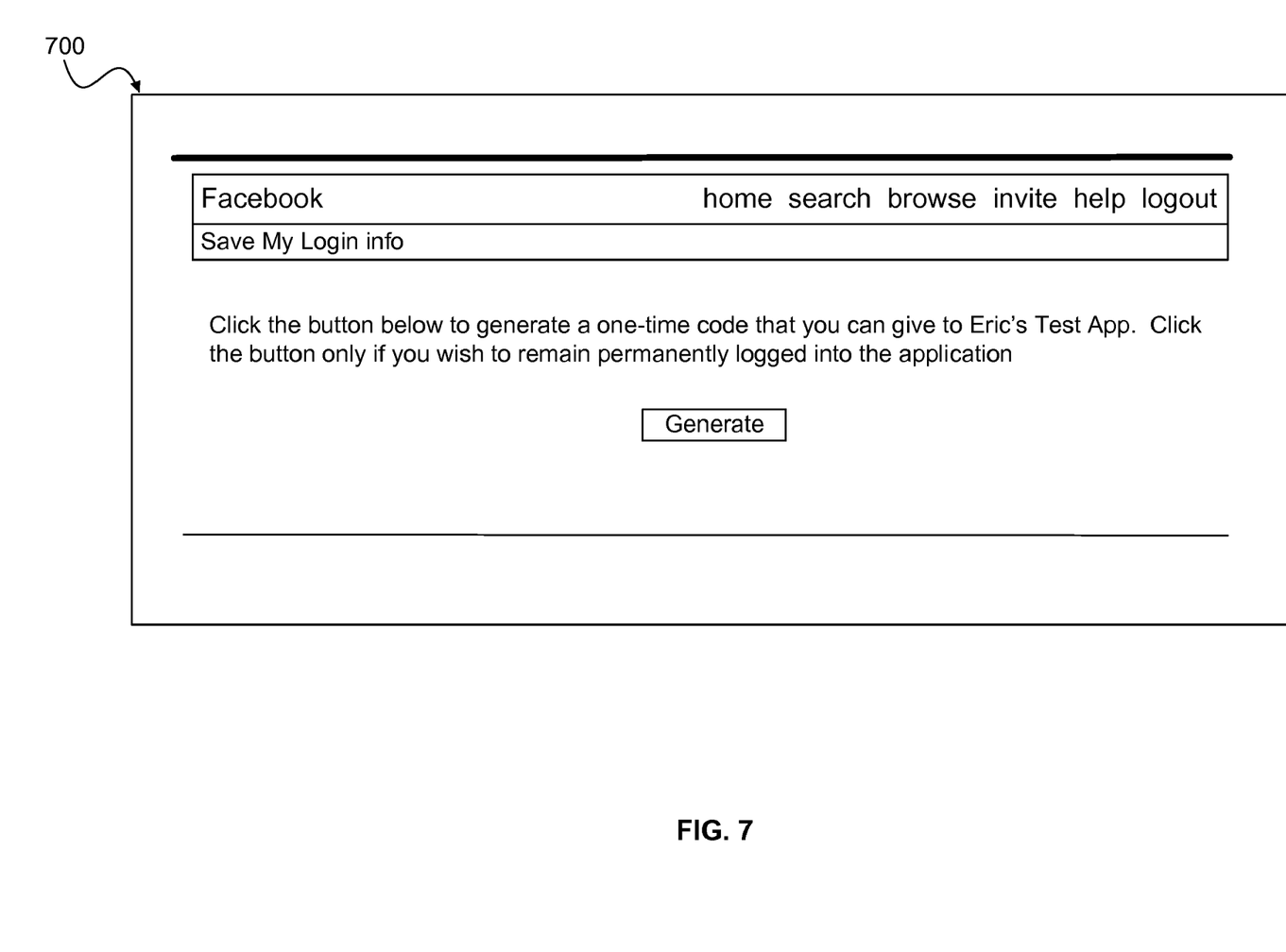
FIG. 7 shows a screenshot of an exemplary screen used for generating a code that may be used for authenticating a network device without a browser.

FIG. 7 shows a screenshot of an exemplary screen used for generating a code that may be used for authenticating a network device without a browser. The exemplary screen 700 may be used to generate a one-time code that allows a network device without a browser to remain permanently logged into a third party developer application.

According to one exemplary system and method, after a user has logged into a third-party application and a web-based social network, they may be given an option as shown in screenshot 700 to generate a one-time code that may be either manually or automatically entered into a network device without an Internet browser. For example, a user may use the exemplary login screen 600 (FIG. 6) to authenticate an extended or permanent session for a third-party application such as the third-party application titled "Eric's Test App." The user may then elect to use the option shown in screenshot 700 to generate a code that may be entered into a network device without an Internet browser, such as the network device without an Internet browser 150 (FIG. 1), to allow the device to authenticate a session with Eric's Test App. and a web-based social network, such as Facebook™.

Figure 8:
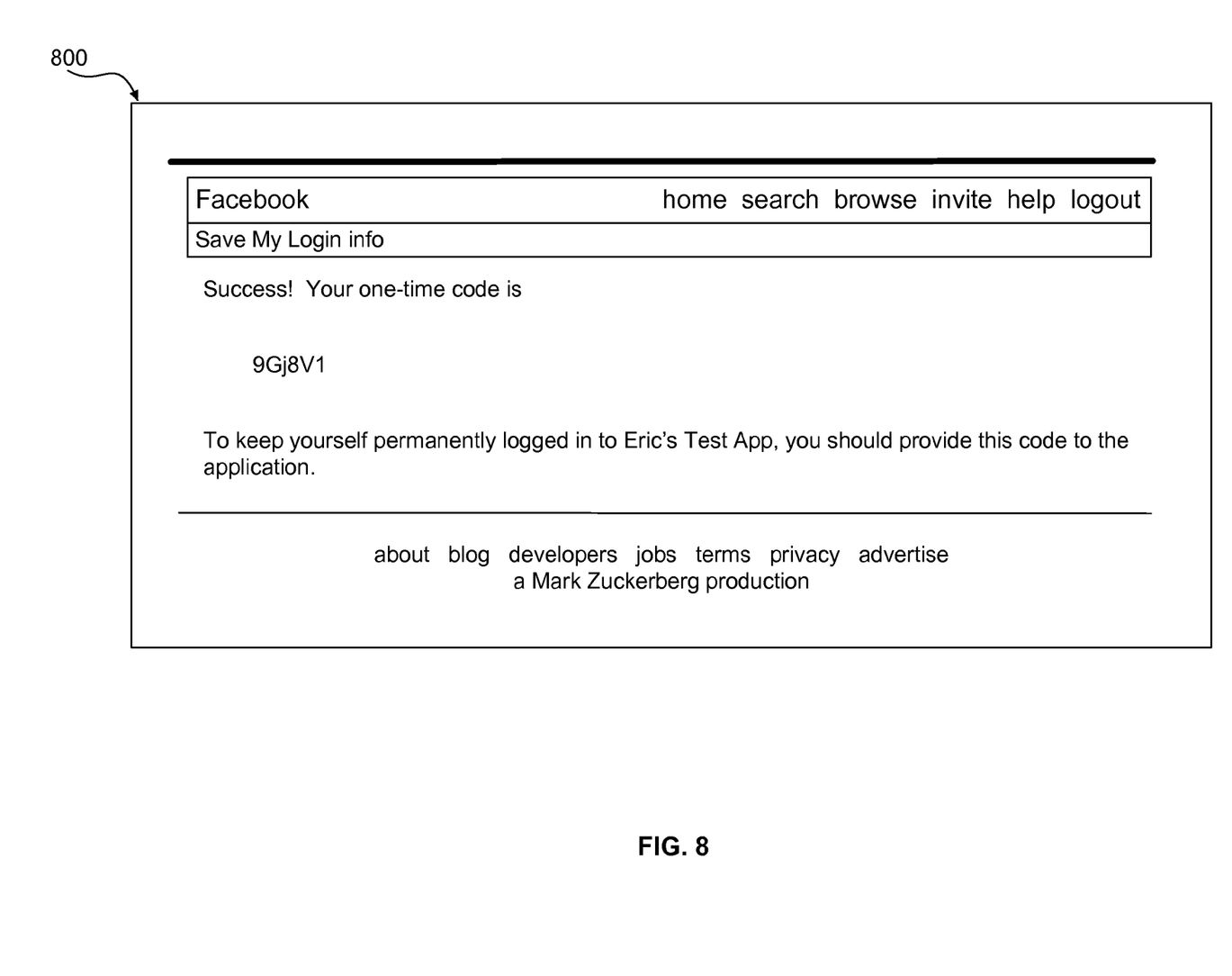
FIG. 8 shows a screenshot of an exemplary screen displaying a code that was generated for authenticating a network device without a browser.

FIG. 8 shows a screenshot of an exemplary screen displaying a code that was generated for authenticating a network device without a browser. According to one exemplary system and method, a one-time code as displayed in screenshot 800 is generated and displayed on a screen. Such a code may be used, for example, to allow a network device without an Internet browser, such as a game console or car navigation system, to access and authenticate a connection via a third-party application to an Internet website, such as a web-based social network. The third-party application may enhance the user experience with the game console or car navigation system by incorporating information from the Internet website. As shown in screenshot 800, the code may be used to keep the network device without an Internet browser permanently logged into a third-party application.

According to further systems and methods, the code may be generated and communicated to the user via other ways, such as by email.

Figure 9:
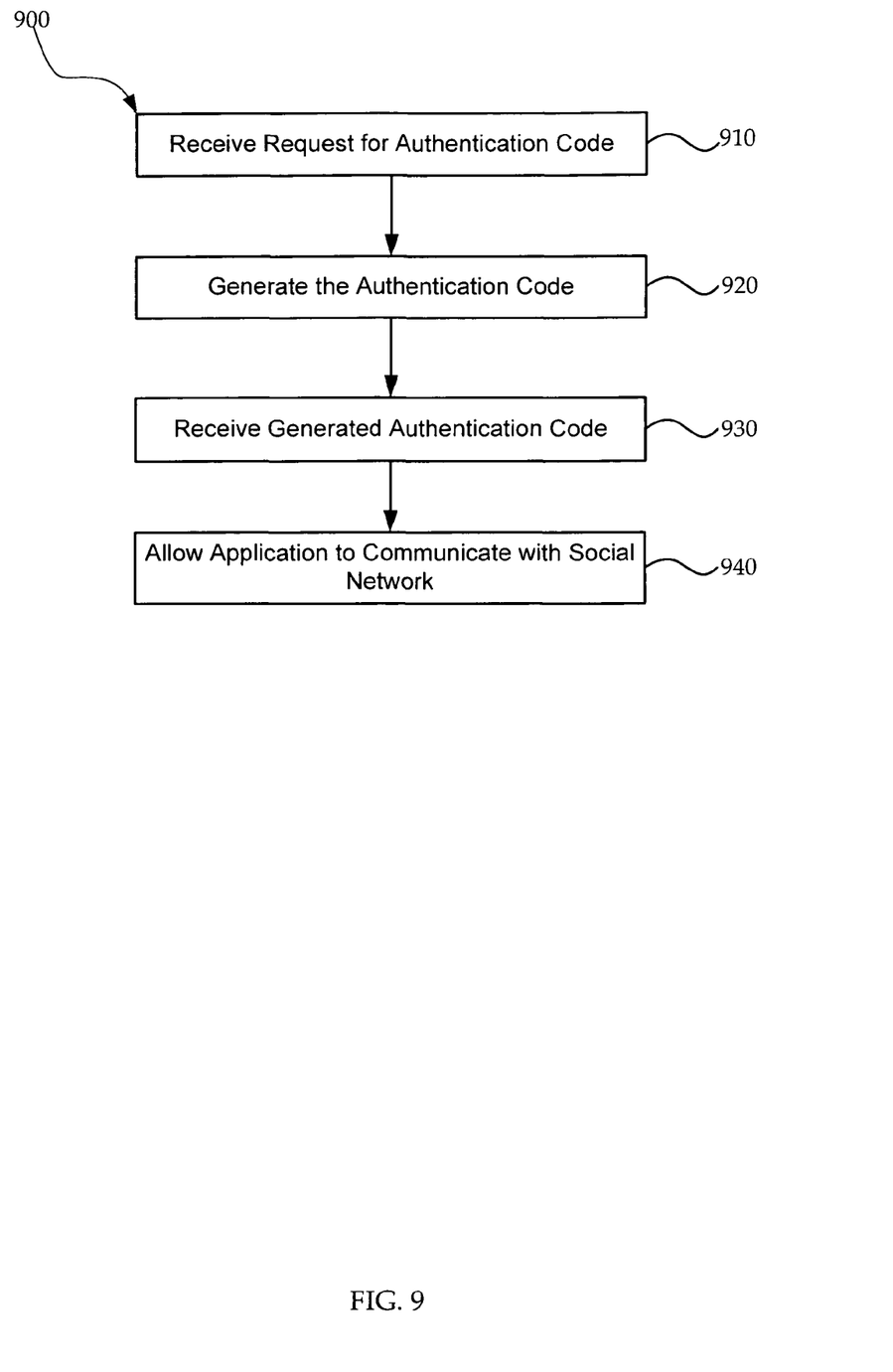
FIG. 9 shows a flow chart of an exemplary method for network authentication.

FIG. 9 shows a flow chart of an exemplary method 900 for network authentication.

At step 910, a request for an authentication code is received. In one exemplary system and method, after a user has logged into a third-party application and a web-based social network, they may be given an option as shown in screenshot 700 (FIG. 7) to request the generation of a one-time code that may be either manually or automatically entered into a network device without an Internet browser.

At step 920, the authentication code is generated. According to various exemplary systems and methods, a one-time code as displayed in screenshot 800 (FIG. 8) is generated and displayed on a screen. According to further systems and methods, the code may be generated and communicated to the user via other ways, such as by email.

At step 930, the generated authentication code is received. In one exemplary system and method, the generated authentication code may be manually or automatically entered in a network device without an Internet browser (e.g. a game console or car navigation system) and received via an application program interface to allow the device to authenticate a connection via a third-party application to an Internet website, such as a web-based social network.

At step 940, the third-party application is allowed to communicate digital data with the web-based social network. According to one exemplary system and method, the third-party application may enhance a user experience with a network device without an Internet browser, such as a game console or a car navigation system, by incorporating information from the Internet website, such as a web-based social network, into the user experience. Further, the device may be logged into the third-party application and/or a distributed database environment for an extended period of time.

While various systems and methods have been described above, it should be understood that they have been presented by way of example only, and not limitation. Thus, the breadth and scope of a preferred embodiment should not be limited by any of the above-described exemplary systems and methods.

What is claimed is:

1. A method comprising:
receiving a request for an authentication code, the request received by a social networking system from a web browser of a user of the social networking system;
generating the requested authentication code by the social networking system;
sending the generated authentication code from the social networking system to the web browser of the requesting user of the social networking system, wherein the authentication code is providable to a network device of the user without a web browser;
receiving the generated authentication code by the social networking system from a third party application, wherein the third party application obtained the authentication code from the network device of the user without a web browser; and
allowing the third party application to communicate with the social networking system conditional upon receiving the authentication code, by providing information about the user from the social networking system to the third party application,
wherein the third party application is configured to provide application content to the network device of the user based on the information about the user received from the social networking system.

2. The method of claim 1, wherein the received generated authentication code allows the third party application to communicate digital data with the social networking system for over twenty-four hours.

3. The method of claim 1, wherein the authentication code is generated by the social networking system.

4. The method of claim 1, wherein the third party application has not been checked for problems by an administrator of the social networking system.

5. The method of claim 1, wherein the third party application resides on a server external to the social networking system.

6. The method of claim 1, wherein the third party application is a desktop application.

7. The method of claim 1, wherein the third party application is a web-based application.

8. The method of claim 1, wherein the network device without a web browser is a game console.

9. The method of claim 1, wherein the network device without a web browser is a picture frame.

10. The method of claim 1, wherein the network device without a web browser is a navigation device for a vehicle.

11. The method of claim 1, wherein the network device without a web browser is a digital camera.

12. The method of claim 1, wherein the social networking system provides information about the user to the third party application subject to privacy rules set by the user.

13. The system of claim 12, wherein the application program interface is configured to allow the third party application to communicate with the social networking system by providing information about the user from the social networking system to the third party application subject to privacy rules set by the user.

14. The computer readable medium of claim 13, wherein the social networking system provides information about the user to the third party application subject to privacy rules set by the user.

15. The computer readable medium of claim 13, wherein the information about the user received from the social networking system comprises information about one or more other users with whom the user has established a connection in the social networking system.

16. The system of claim 12, wherein the information about the user received from the social networking system comprises information about one or more other users with whom the user has established a connection in the social networking system.

17. The method of claim 1, wherein the information about the user received from the social networking system comprises information about one or more other users with whom the user has established a connection in the social networking system.

18. A system comprising:
an application program interface configured for receiving a request for an authentication code, the request received by a social networking system from a web browser of a user of the social networking system; and
a code generator in communication with the application program interface, the code generator configured to generate the requested authentication code;
wherein the application program interface is further configured to:
send the generated authentication code from the social networking system to the web browser of the requesting user of the social networking system, wherein the authentication code is providable to a network device of the user without a web browser,
receive the generated authentication code from a third party application, wherein the third party application obtained the authentication code from the network device of the user without a web browser, and
allow the third party application to communicate with the social networking system conditional upon receiving the authentication code, by providing information about the user from the social networking system to the third party application, wherein the third party application is configured to provide application content to the network device of the user based on the information about the user received from the social networking system.

19. The system of claim 18, wherein the received generated authentication code allows the third party application to communicate digital data with the social networking system for over twenty-four hours.

20. A non-transitory computer readable medium having embedded thereon a program, the program being executable by a processor for performing a method comprising:
receiving a request for an authentication code, the request received by a social networking system from a web browser of a user of the social networking system;
generating the requested authentication code by the social networking system;
sending the generated authentication code from the social networking system to the web browser of the requesting user of the social networking system, wherein the authentication code is providable to a network device of the user without a web browser;
receiving the generated authentication code by the social networking system from a third party application, wherein the third party application obtained the authentication code from the network device of the user without a web browser; and allowing the third party application to communicate with the social networking system conditional upon receiving the authentication code, by providing information about the user from the social networking system to the third party application, wherein the third party application is configured to provide application content to the network device of the user based on the information about the user received from the social networking system.

* * * * *